May 18, 1965     W. K. FISCHER     3,184,527

SQUEEZE-COATING PROCESS

Filed Nov. 5, 1962

INVENTOR
WILLIAM K. FISCHER
BY
Robert J. Patterson
ATTORNEY 3,184,527
SQUEEZE-COATING PROCESS
William K. Fischer, Woodbury, Conn., assignor to United
States Rubber Company, New York, N.Y., a corporation of New Jersey
Filed Nov. 5, 1962, Ser. No. 235,237
4 Claims. (Cl. 264—255)

This invention relates to a novel squeeze-coating process. More particularly, this invention relates to a method of preparing articles having a smooth, polyester surface, which method comprises preparing a base resin formulation containing reinforcing fibers, molding and partially curing such base resin, placing a mass of polyester material of desired flow, viscosity, and curing characteristics on the partially cured resin, applying heat and pressure to the mass to cause it to be squeezed and thereby flow over the surface of the partially cured resin to form a smooth surface layer thereover, and by the action of heat and pressure to cure both the polyester material making up the surface layer and at the same time to complete the cure of the partially cured base resin, thereby bonding the polyester layer firmly to the base resin and thus produce a smooth polyester surface securely bonded to the resin base.

Various polyester resins (e.g., unsaturated alkyd resins, prepared mainly from saturated polyhydric alcohols and ethylenically-unsaturated polycarboxylic acids) and various resinous products made from polyester resins along with a polymerizable ethylenically unsaturated monomer, are well known in the art, and are known to possess considerable hardness, abrasion resistance, chemical resistance, and toughness, and are hence particularly suitable for use in articles wherein these properties are desirable. Such resinous compositions are readily moldable, and when reinforced with appropriate fibrous reinforcing material, such as glass fibers or the like, can be used to produce molded articles having excellent mechanical strength.

However, when such resinous products have been reinforced with fibrous materials such as glass fibers, the resulting article generally has suffered from the disadvantage that the surface thereof exhibits irregularities and is not altogether smooth. This is due to the presence of the fibrous material in the article, for such fibers are present not only in the interior of the article, but also at and near the surface thereof, thereby resulting in the aforesaid surface irregularities. Moreover, different coefficients of expansion for glass and resin, as well as residual curing and shrinkage of the resin after removal from the mold, further contribute to surface irregularities.

An additional drawback of prior art fiber-reinforced resinous products is the fact that after the resin has been cured there frequenlty result minute air voids. In order to paint such a fiber-reinforced resinous material, it is usually necessary to sand the surface thereof in order to promote good adherence of the paint to the surface and also to remove any surface fibers. However, such sanding will generally expose voids or air pockets contained in certain of the glass fibers that have not been completely saturated with resin, thereby further contributing to surface irregularities.

It is an object of the present invention to provide a novel method of coating a resinous article reinforced with fibrous material, whereby a smooth, hard surface coating is provided, which coating adheres rigidly and tenaciously to the fiber-reinforced resin.

Another object of the present invention is to provide a method of coating a fiber-reinforced resinous article to provide an attractive surface coating that tenaciously adheres to the fiber-reinforced resin, which coating is free of surface irregularities.

Additional objects will become apparent hereinafter.

The above objects, characteristics, and features of my invention will be best understood by reference to the following detailed description taken in conjunction with the accompanying drawing which schematically illustrates one means for carrying out the method of my invention wherein.

Figure 5:
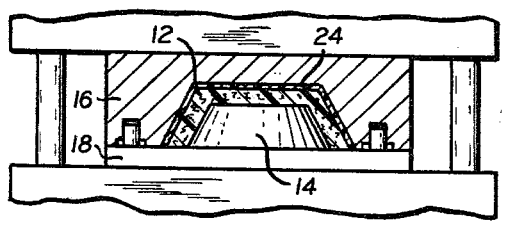
Figure 6:
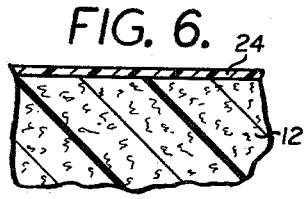

FIG. 5 shows the heated platens brought together to squeeze the polyester mass, cause it to conform to the shape of the article as a polyester surface coating, and to cure and bond the polyester surface to the resin-impregnated fibrous preform; and FIG. 6 is a partial cross section of a portion of the finished molded product and shows the polyester surface coating bonded to the fiber-reinforced base resin.

The fiber-reinforced partially cured base resin can be made by preparing a mixture of resin, reinforcing fibers, and filler, and then subjecting such mixture to appropriate conditions of temperature and pressure, whereby a partial cure of the resin is effected.

Alternatively, fibrous reinforcing material, e.g., glass matte or the like, may be cut and preformed with suitable binder so as to be shaped in the form of the article to be molded. Such glass preform 10 is then impregnated with an appropriate base resin formulation, typically a polyester formulation. The base resin formulation will generally contain an alkyd polyester along with an ethylenically unsaturated polymerizable material such as styrene or the like, plus conventional material such as pigments, catalysts, fillers, and the like. The viscosity is adjusted such that the base resin is readily flowable and will easily impregnate the glass preform.

Figure 2:
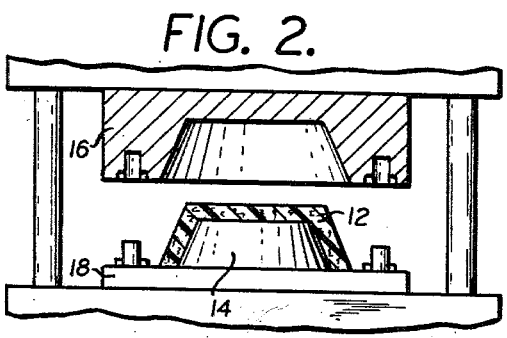
FIG. 2 shows a resin-impregnated fibrous preform placed in position in the press.
Figure 3:
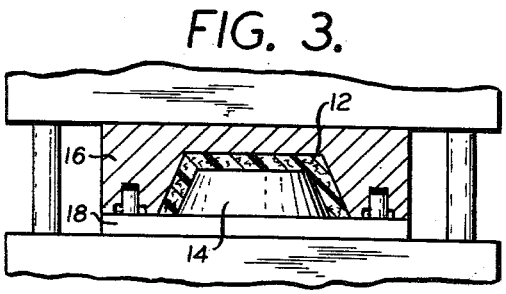
FIG. 3 shows the heated press platens brought together to cause the resin-impregnated fibrous preform to assume the desired contour of the molded article and to partially cure the resin.

The fibrous preform is then placed on the mold and the base resin formulation is poured thereover in order to impregnate the preform. The thus impregnated preform, designated by the reference character 12 is disposed over the mold plug 14 (FIG. 2). Thereafter, the upper platen 16 and lower platen 18 of the press 20 are brought together and heat and pressure are applied, to thereby evenly distribute and fully impregnate the preform with resin and to partially cure the fiber-containing base resin formulation and hence to impart a rigidity and form stability thereto (FIG. 3).

Figure 4:
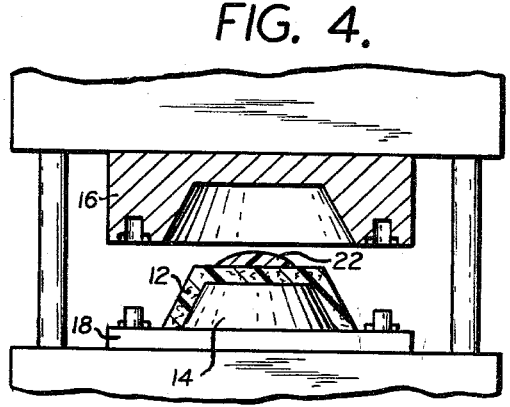
FIG. 4 shows the press platens separated and the addition of a mass polyester material to be used as a surface coating.

After the base resin formulation has been partially cured, a mass or "blob" 22 of suitable polyester formulation, which mass is quite viscous and has desired flow characteristics, is placed on the top of the partially cured fiber-reinforced resin 12, as shown in FIG. 4. Thereafter, heated platens 16 and 18 are again brought together to thereby apply pressure and heat, thus causing mass 22 (FIG. 4) to flow over the entire surface of the partially cured fiber-reinforced base resin 12 to form a thin layer 24 (FIG. 5). Moreover, since heat is applied along with pressure, the squeezing is accompanied by a curing of the polyester layer 24, along with a completion of the curing of the partially cured base resin 12, so that a tenacious bond is developed between the layer 24 (which originated from mass 22) and the fiber-reinforced base resin 12. As shown in FIG. 6, the resultant article has a smooth, tough, surface layer 24 that contains no fibers to disrupt the surface and hence is virtually free of surface irregularities. This surface layer 24 is firmly bonded to the fiber-reinforced base resin 12.

It will be understood that the smooth surface layer 24, because of its relative freedom from surface irregularities, renders the resultant product eminently suitable for commercial applications. The surface layer may, if desired, be pigmented to any color or can be painted.

It will be understood that the viscosity and flow characteristics of the base resin formulation which is to be mixed with the fibrous preform can be adjusted as desired, depending upon the nature of the specific end product. Similarly, the degree of the partial cure of the fiber-reinforced base resin will vary depending upon whether such base resin is to be flexible, semi-rigid, or rigid. In general, the hardness (which is a measure of the degree of the cure) may be anywhere from about 0 to 75 (Shore Hardness, D Scale), depending upon the degree of flexibility or rigidity desired. For example, where a relatively rigid resin is contemplated, the partial cure is such that the Shore D-hardness (as measured on the hot part immediately after opening the mold) will be about 60. It will be readily understood that the partial cure should be carried out to impart a sufficient degree of rigidity that the fibers are restrained from "popping up" out of the resin.

The polyester and ethylenically unsaturated monomer making up the mass or blob 22 should ordinarily have a somewhat higher viscosity than that of the base resin formulation. This viscosity should be such that the mass 22 is capable of being squeezed so that it will flow over the entire surface of the base 12, yet must be sufficiently viscous so as not to be bled out of the mold when pressure is applied. Moreover, the formulation making up the mass 22 should desirably have a gel time sufficiently long that the mass can be completely distributed over the base before gelling, yet such that the layer 24 will gel within a short time, desirably within a few seconds, after the mold has been closed and pressure applied.

The viscosities for both the base resin formulation and for the mass or blob 22 will be dependent upon a number of factors, e.g., the shape and size of the particular article being fabricated, the temperatures and pressures employed, the speed of the closure of the mold, the thickness of the squeeze coat, the catalyst level, etc. Similarly, the curing time, temperature, and pressure employed, both to effect a partial curing of the base resin formulation and to effect the final curing and bonding of the surface layer to the base resin, may vary within wide limits depending upon the foregoing factors. In general, the mold pressure should be at least 50 pounds per square inch, the temperature should be from about 215 to 300° F., and the time for curing should be from as little as a few seconds, e.g., 30 seconds, up to five minutes or even longer.

If desired, there can be introduced into the base resin formulation and/or the formulation for the mass or blob 22, other curable resins such as, e.g., phenolic resins, epoxy resins, and the like.

It will be appreciated that in carrying out the principles of my invention, one can use any of a large number of known resins or resin mixtures of the types commonly referred to as "unsaturated polyesters." The latter term used here as above to means resinifiable masses containing or composed of organic polycarboxylic acid esters which are polymerizable mainly by reason of ethylenic unsaturation in the polycarboxylic acid radicals and which are employed either by themselves or in combination with polymerizable ethylenically-unsaturated compounds, e.g., styrene, dialkyl, phthalate, trialkyl cyanurate, alpha methyl styrene and the like, usually in monomeric or low-polymer form. It should be understood, however, that such unsaturated polyester resins need not be free of saturated polyesters or other heat-convertible modifying resins, and that various modifying polymerizable, saturated polyester resins or convertible resinous masses (e.g., alkyds) can be used in minor to prominent amounts therein. It should also be understood that the unsaturated polyesters and/or mixtures of saturated and unsaturated polyesters can be modified in a variety of other ways well known to those skilled in the art. The following patents are illustrative of unsaturated polyesters which are suitable in practicing the principles of my invention: U.S. Patents 2,512,410, 2,593,787, 2,280,256, 2,453,666, 2,443,736, 2,443,737, 2,409,633, 2,610,168 and 2,635,089.

It is well known to those skilled in the art that 100% polymerizable polyester liquid can be so formulated as to be partially curable to a substantially rigid state, which partial curing precedes the fully cured state. Curing of the liquid involves exothermic reactions, and the evolvement of heat tends to accelerate the reaction. Accordingly, by selection of appropriate quantities of peroxide catalysts with desired rates of activity, and of appropriate polymerization stabilizers and/or inhibitors, the reactive mass can be kept from initially proceeding to its fully cured state, and thereby can be rendered suitable for a partial curing. It is desirable that the base resin formulation be so prepared as to be susceptible to such partial curing.

It will be understood that suitable polyesters of the type described above are 100% polymerizable. The polyester formulations employed may contain one or more unsaturated polyesters, along with polymerizable ethylenically unsaturated monomeric material. If desired, two or more different polyesters can be mixed together. In this manner a large number of polyester formulations, from a relatively few stock resin formulations, can be prepared. Such stock resin formulations are generally distinguishable from one another on the basis of relative rigidity or flexibility of the resins resulting therefrom.

Those skilled in the art of formulating unsaturated polyester resins recognize that the proportions of saturated carboxylic acids to $\alpha,\beta$-unsaturated carboxylic acids, the length of the carbon chain(s) involved in the carboxylic acids and in the polyhydric alcohols, the proportion of polyester to polymerizable unsaturated monomer, the type of ethylenic monomer, the degree of functionality in the carboxylic acids and polyhydric alcohols, and the curing treatment(s), are all factors affecting the flexibility and/or rigidity of the cured resin. Since such knowledge is now known and has been long used by those skilled in the art, and is only an incidental feature in the present invention, no extended discussion of such formulation details seems necessary to enable a person skilled in the art to practice the present invention.

My invention will be further illustrated by the following examples. All parts are by weight unless otherwise indicated.

*Example 1*

Figure 1:
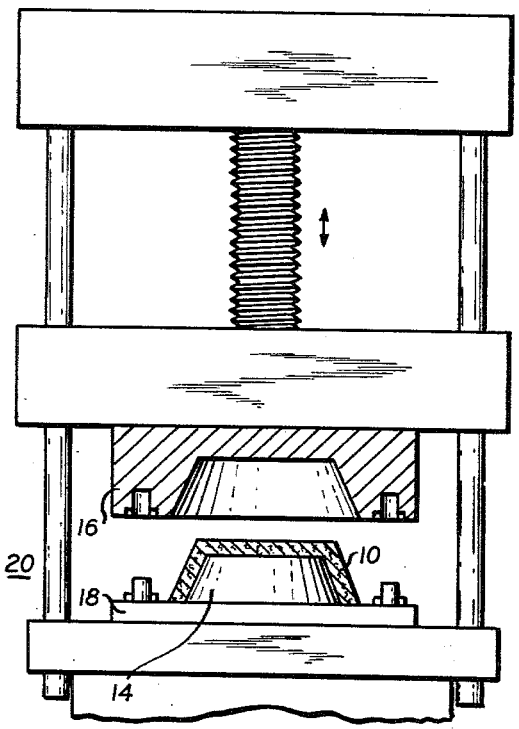
FIG. 1 is a profile view in partial section showing a conventional press with a fibrous preform adapted to be used in the method of my invention.

Using the apparatus shown in FIG. 1, six ounces of fiberglass matte preform (Owens Corning Matte) were placed over the mold plug 12. The following base resin formulation was poured over the matte and allowed to impregnate the matte:

| Component: | Amount, grams |
|---|---|
| Polyester A | 100 |
| Calcium carbonate (Surfex) filler | 30 |
| Benzoyl peroxide | 1 |
| Styrene | 3 |

Polyester A is a liquid heat-hardenable polyester composition prepared from the following materials:

| Material: | Amount |
|---|---|
| Dipropylene glycol | 1.05 moles. |
| Fumaric acid | 1.00 mole. |
| Rosin WG (primarily abietic acid) | 0.25 mole. |
| Parabenzoquinone | 120 parts per million. |
| Styrene | 30% based on the weight of the dipropylene glycol, fumaric acid, and rosin. |

Platens 16 and 18 were then brought together to apply a pressure of about 150 p.s.i. to the impregnated preform, and the whole was subjected to a temperature of about 230° F. for about 1.5 minutes to effect a partial cure of the resin.

The platens were then separated and a mass 22 of the following composition was placed over the impregnated preform, as shown in FIG. 4.

| Component: | Parts, grams |
|---|---|
| Polyester B | 210 |
| Polyester C | 600 |
| Styrene | 90 |
| 50% solution of benzoyl peroxide in tricresyl phosphate plasticizer | 6 |

Polyesters B and C are similar heat-hardenable compositions, their formulation being as follows.

Polyester B:
73.5% of alkyd resin [1]
26.5% styrene

[1] The resin is prepared from 1.5 moles of maleic anhydride, 1 mole of phthalic anhydride, 0.65 mole of ethylene glycol, and 1.98 mole of diethylene glycol.

| Polyester C: | Weight |
|---|---|
| Polyester B | 85 |
| Polyester alkyd [1] | 15 |
| Titanium dioxide | 1.67 |
| Mica | 28 |
| Silica dioxide | 3 |

[1] 75 moles of adipic acid, 25 moles of maleic acid, and 100 moles of styrene.

Platens 16 and 18 were again brought together to squeeze the mass 22 to form a thin layer 24 over the outer surface of the fiber-reinforced base resin 12. The pressure was maintained at about 150 p.s.i. for a period of about four minutes, with the temperature being maintained at about 230° F. Thereafter, the mold platens were separated and the article was removed. The article showed a tenacious bond between the surface coating 24 and the resinous base 12 and a smooth surface free of serious surface irregularities. Thus, surface irregularities measured a maximum of 3.5 microinches.

Example 2

The foregoing example was repeated, however, the temperature was maintained at 260° F. rather than 230° F. Accordingly, the time of partial cure of the base resin was reduced from 1.5 minutes to about 45 seconds, and the time of final cure was reduced from four minutes to one minute. The resultant product exhibited the same smooth surface as that of Example 1.

Variations can of course be made without departing from the spirit of my invention.

Having thus described my invention, what I desire to secure and claim by Letters Patent is:

1. A method of making a rigid, fiber-reinforced article having a smooth polyester resin surface substantially free of surface irregularities, this method comprising impregnating fibrous reinforcing material with a mixture of an unsaturated polyester and an ethylenically unsaturated monomer copolymerizable therewith, and subjecting said impregnated fibrous material to curing conditions for a time sufficient to partially cure said polyester and monomer to thereby form a dimensionally stable, fiber-reinforced, partially cured base, placing a mass of relatively viscous material comprising an unsaturated polyester and an ethylenically unsaturated monomer copolymerizable therewith on said base, and applying heat and pressure to said mass to thereby cause said mass to be squeezed such that it flows and forms a layer over the surface of said base, said heat and pressure being applied for a time sufficient to cure said layer and to complete the cure of previously partially-cured polyester and monomer in said base, to thereby effect a firm, tenacious bond between said layer and said base.

2. A method of making a rigid, fiber-reinforced article having a smooth polyester resin surface substantially free of surface irregularities, this method comprising impregnating fibrous glass reinforcing material with a mixture of an unsaturated polyester and an ethylenically unsaturated monomer copolymerizable therewith, and subjecting said impregnated fibrous glass material to curing conditions for a time sufficient to partially cure said polyester and monomer to thereby form a dimensionally stable, glass fiber-reinforced, partially cured base, placing a mass of relatively viscous material comprising an unsaturated polyester and an ethylenically unsaturated monomer copolymerizable therewith on said base, and applying heat and pressure to said mass to thereby cause said mass to be squeezed such that it flows and forms a layer over the surface of said base, said heat and pressure being applied for a time sufficient to cure said layer and to complete the cure of previously partially-cured polyester and monomer in said base, to thereby effect a firm, tenacious bond between said layer and said base.

3. A method of making a rigid, fiber-reinforced article having a smooth polyester resin surface substantially free of surface irregularities, this method comprising impregnating fibrous glass reinforcing material with a mixture of an unsaturated polyester and styrene and subjecting said impregnated fibrous glass material to curing conditions for a time sufficient to partially cure said polyester and styrene to thereby form a dimensionally stable, glass fiber-reinforced, partially cured base, placing a mass of relatively viscous material comprising an unsaturated polyester and styrene on said base, and applying heat and pressure to said mass to thereby cause said mass to be squeezed such that it flows and forms a layer over the surface of said base, said heat and pressure being applied for a time sufficient to cure said layer and to complete the cure of previously partially-cured polyester and styrene in said base, to thereby effect a firm, tenacious bond between said layer and said base.

4. A method of making a rigid, fiber-reinforced article having a smooth polyester resin surface substantially free of surface irregularities, this method comprising impregnating fibrous glass reinforcing material with a mixture of an unsaturated polyester and an ethylenically unsaturated monomer copolymerizable therewith, and subjecting said impregnated fibrous glass material to curing conditions for a time sufficient to partially cure said polyester and monomer to thereby form a dimensionally stable, glass fiber-reinforced, partially cured base, placing a mass of relatively viscous material comprising an unsaturated polyester and an ethylenically unsaturated monomer copolymerizable therewith on said base, and subjecting said mass and said base to a pressure of at least 50 pounds per square inch and a temperature of from about 215 to 300° F. for a period of time of from about 30 seconds to 5 minutes to cure said layer and to complete the cure of previously partially-cured polyester and monomer in said base, to thereby effect a firm, tenacious bond between said layer and said base.

References Cited by the Examiner

UNITED STATES PATENTS

| | | | |
|---|---|---|---|
| 2,377,393 | 6/45 | Wiley | 264—254 |
| 2,444,394 | 6/48 | Arnold | 264—257 |
| 2,495,640 | 1/50 | Muskat | 264—257 |
| 2,688,580 | 9/54 | Fingerhut | 264—257 |
| 2,797,179 | 6/57 | Reynolds et al. | 264—257 |
| 2,797,180 | 6/57 | Baldanza | 264—257 |

ROBERT F. WHITE, *Primary Examiner.*

ALEXANDER H. BRODMERKEL, *Examiner.*